United States Patent
Kormanik

(10) Patent No.: US 9,528,615 B2
(45) Date of Patent: Dec. 27, 2016

(54) INTERNALLY VENTED VALVE

(75) Inventor: Christopher Riordan Kormanik, Carnesville, GA (US)

(73) Assignee: Ross Operating Valve Company, Troy, MI (US)

( * ) Notice: Subject to any disclaimer, the term of this patent is extended or adjusted under 35 U.S.C. 154(b) by 1662 days.

(21) Appl. No.: 12/858,642

(22) Filed: Aug. 18, 2010

(65) Prior Publication Data
US 2012/0024407 A1 Feb. 2, 2012

Related U.S. Application Data

(60) Provisional application No. 61/369,313, filed on Jul. 30, 2010.

(51) Int. Cl.
*F16K 11/07* (2006.01)

(52) U.S. Cl.
CPC ...... *F16K 11/0716* (2013.01); *Y10T 137/8671* (2015.04); *Y10T 137/86702* (2015.04)

(58) Field of Classification Search
CPC .................. Y10T 137/86702; Y10T 137/8671; F16K 137/8671
USPC .............................. 137/625.68, 628.2, 625.2, 625.25,137/625.67, 625.26, 625.48, 625.49, 383,137/625.66, 625.63; 277/569, 910
See application file for complete search history.

(56) References Cited

U.S. PATENT DOCUMENTS

| | | | |
|---|---|---|---|
| 2,995,337 A | 8/1961 | Tanner | |
| 4,000,684 A | 1/1977 | Ruffley | |
| 4,187,880 A | 2/1980 | Humpert et al. | |
| 4,557,609 A * | 12/1985 | Moren | 384/94 |
| 4,813,925 A | 3/1989 | Anderson, Jr. et al. | |
| 4,995,421 A | 2/1991 | Bonacorsi et al. | |
| 5,699,829 A * | 12/1997 | Weiler, Jr. et al. | 137/383 |
| 6,209,563 B1 * | 4/2001 | Seid et al. | 137/15.21 |
| 2008/0129364 A1 | 6/2008 | Cook | |

FOREIGN PATENT DOCUMENTS

| | | |
|---|---|---|
| DE | 2108705 | 8/1972 |
| FR | 1190846 | 10/1959 |
| JP | 61-135062 | 8/1986 |
| JP | 2005-069463 | 3/2005 |

OTHER PUBLICATIONS

International Search Report and Written Opinion mailed Apr. 6, 2011 for PCT Application No. PCT/US2010/045844.

* cited by examiner

*Primary Examiner* — William McCalister

(74) *Attorney, Agent, or Firm* — Carlson, Gaskey & Olds, P.C.

(57) ABSTRACT

A valve includes a valve body including a main passage defining a first volume and a second volume. The valve also includes a valve spool moveable relative to the valve body. The valve spool includes a central vent passage capable of fluid communication with each of the first volume and the second volume. Air flows between the first volume and the second volume through the central vent passage as the valve spool moves relative to the valve body and as the valve changes between an actuated position and a non-actuated position.

18 Claims, 4 Drawing Sheets

_US 9,528,615 B2_

INTERNALLY VENTED VALVE

REFERENCE TO RELATED APPLICATION

This application claims priority to U.S. Provisional Application No. 61/369,313 that was filed on Jul. 30, 2010.

BACKGROUND OF THE INVENTION

The present invention relates generally to an internally vented valve.

Two way valves have a condition where there is an area between two seals that changes in volume depending on a position of a valve spool in a valve body. A vent hole is usually drilled from outside of the valve body to a volume inside the valve body. As the valve spool moves in the valve body, air is either sucked into or blown out of the vent hole. If the volume is not allowed to vent or equalize its pressure, the valve will not properly function. The vent hole could provide an open path for contaminates to enter the valve, which can then require cleaning.

SUMMARY OF THE INVENTION

A valve includes a valve body including a main passage defining a first volume and a second volume. The valve also includes a valve spool moveable relative to the valve body. The valve spool includes a central vent passage capable of fluid communication with each of the first volume and the second volume. Air flows between the first volume and the second volume through the central vent passage as the valve spool moves relative to the valve body and as the valve changes between an actuated position and a non-actuated position.

In another exemplary embodiment, a valve includes a valve body including a main passage defining a first volume and a second volume. The valve also includes a valve spool moveable relative to the valve body. The valve spool includes a central vent passage, and a first vent passage and a second vent passage that are substantially transverse to the central vent passage and in fluid communication with the central vent passage. The first vent passage is capable of fluid communication with the first volume, and the second vent passage is capable of fluid communication with the second volume. As the valve spool moves relative to the valve body, air flows between the first volume and the second volume through the central vent passage, the first vent passage, the second vent passage. The valve spool moves relative to the valve body, and the valve changes between an actuated position and a non-actuated position. The valve also includes a first exterior spool extension and a second exterior spool extension attached to the valve spool. When the valve is in the actuated position, the first vent passage is not in fluid communication with the first volume, and the second vent passage is in fluid communication with the second volume. When the valve is in the non-actuated position, the first vent passage is in fluid communication with the first volume, and the second vent passage is not in fluid communication with the second volume. The first volume contains no air and the second volume contains air when the valve is in the actuated position, and the first volume contains air and the second volume contains no air when the valve is in the non-actuated position. Air is transferred between the first volume and the second volume as the valve spool moves relative to the valve body through the central vent passage, the first vent passage and the second vent passage.

In another exemplary embodiment, a method of venting air in a valve includes the step of moving a valve spool relative to a valve body, the valve body including a main passage defining a first volume and a second volume and the valve spool including a central vent passage capable of fluid communication with each of the first volume and the second volume. The method also includes the step of flowing air between the first volume and the second volume through the central vent passage during the step of moving.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompanies the detailed description can be briefly described as follows.

DETAILED DESCRIPTION OF THE PREFERRED EMBODIMENT

Figure 1:
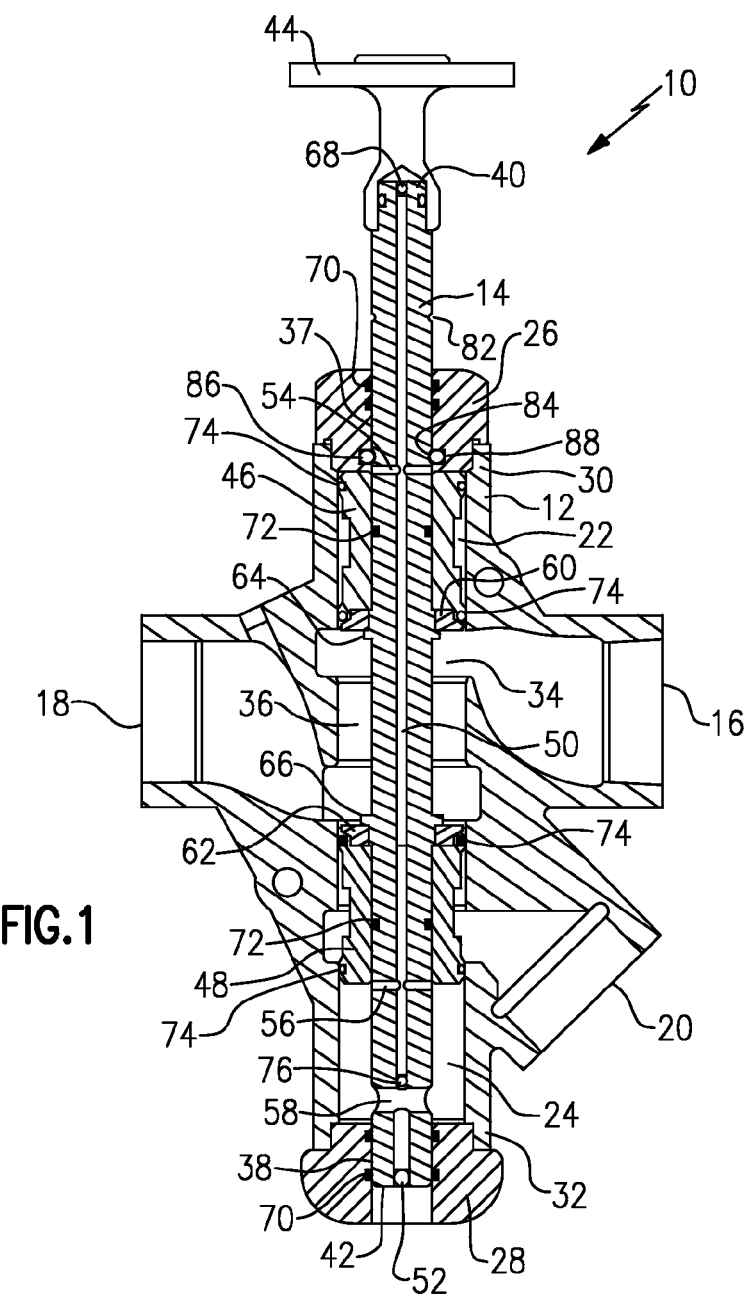
FIG. 1 illustrates a valve in an actuated position.

FIG. 1 illustrates a valve 10 in an actuated position (or open position). In one example, the valve 10 is a 2" valve. The valve 10 can be used in any environment, for example, in a pharmaceutical, food or off shore drilling environment.

The valve 10 includes a valve body 12 and a valve spool 14 slidable in the valve body 12. In one example, the valve body 12 is made of metal. The valve body 12 includes an inlet 16, an outlet 18 and an exhaust 20. The valve body 12 also defines a first volume 22 and a separate second volume 24, which are in fluid communication with each other during movement of the valve spool 14 relative to the valve body 12 and are therefore both are variable. In one example, a first seal retainer 26 is located at a first end 30 of the valve body 12, and a second seal retainer 28 is located at an opposing second end 32 of the valve body 12. In one example, the seal retainers 26 and 28 are made of stainless steel. At least one seal 70 is located between the valve spool 14 and each of the seal retainers 26 and 28. The seal retainers 26 and 28 are attached to the valve body 12. In one example, the seals 70 are o-rings located in a groove (not shown) in the seal retainers 26 and 28. In one example, the seals 70 are made of an elastomer, such as rubber.

The valve body 12 includes a main passage 34 that extends longitudinally from the first end 30 to the second end 32 of the valve body 12. The main passage 34 includes the first volume 22, the second volume 24 and an air passage 36 located between the inlet 16 and the outlet 18 and between the first volume 22 and the second volume 24.

The valve spool 14 extends though a passage 37 of the first seal retainer 26, the main passage 34 of the valve body 12, and a passage 38 of the second seal retainer 28. In one example, the valve spool 14 is made of stainless steel. The valve spool 14 includes a first end 40 located near the first seal retainer 26 and the first end 30 of the valve body 12 and an opposing second end 42 located near the second seal retainer 28 and the second end 32 of the valve body 12. A handle 44 is attached to the first end 40 of the valve spool 14. The valve 10 is changed from the actuated position of FIG. 1 to the non-actuated position (or closed position) of FIG. 5 by manually actuating the handle 44. A first exterior spool extension 46 and a second exterior spool extension 48 are attached to the valve spool 14 and located within the valve body 12. In one example, the exterior spool extensions 46 and 48 are threaded on the valve spool 14. At least one seal 72 is located between the valve spool 14 and each of the exterior spool extensions 46 and 48. In one example, the seals 72 are o-rings located in a groove (not shown) in the valve spool 14. In one example, the seals 72 are made of an elastomer, such as rubber.

A central vent passage 50 extends longitudinally from the first end 40 to the second end 42 of the valve spool 14. A ball bearing 68 is located in the central vent passage 50 at the first end 40 of the central vent passage 50, and a ball bearing 52 is located in the central vent passage 50 at the second end 42 of the central vent passage 50. The valve spool 14 also includes a first vent passage 54 and a second vent passage 56 transverse to the central vent passage 50. In one example, the first vent passage 54 and the second vent passage 56 are perpendicular to the central vent passage 50.

The valve spool 14 also includes a lock passage 58 located between the second vent passage 56 and the second end 42 of the valve spool 14. A ball bearing 77 is located above the lock passage 58 between the lock passage 58 and the second vent passage 56. The ball bearings 68, 76 and 77 seal the central vent passage 50 and prevent the leakage of air.

A first inner spool extension 60 and a second inner spool extension 62 surround the valve spool 14. The first inner spool extension 60 is located and retained between the first exterior spool extension 46 and an annular projection 64 of the valve spool 14, and the second inner spool extension 62 is located and retained between the second exterior spool extension 48 and an annular projection 66 of the valve spool 14. The inner spool extensions 60 and 62 are not threaded to the valve spool 14.

Figure 2:
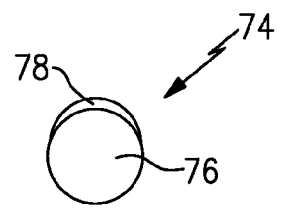
FIG. 2 illustrates a seal of the valve.

At least one seal 74 is located between the valve body 12 and each of the exterior spool extensions 46 and 48. In one example, the seals 74 are o-rings located in a groove (not shown) in the exterior spool extensions 46 and 48. As shown in FIG. 2, each seal 74 includes a first portion 76 made of an elastomer (such as rubber) and a second portion 78 made of a non-stick material, such as Teflon® (registered trademark owned by E. I. du Pont de Nemours and Company of Wilmington, Del.). The second portion 78 of each seal 74 contacts the valve body 12 to provide smooth movement of the valve spool 14 relative to the valve body 12.

The valve spool 14 includes a first annular groove 84 and a second annular groove 82. The first seal retainer 26 includes an annular groove 88 that receives an annular resilient member 86. In one example, the annular resilient member 86 is a spring. The first annular groove 84 receives the annular resilient member 86 to retain the valve spool 14 in the actuated position of FIG. 1, and the second annular groove 82 receives the annular resilient member 86 to retain the valve spool 14 in the non-actuated position of FIG. 5. The annular grooves 82 and 84 and the annular resilient member 86 act as a detent.

As shown in FIG. 1, when the valve 10 is in the actuated position (or open position), fluid, such as air, enters the valve 10 through the inlet 16, flows through the air passage 36 and exits the valve 10 through the outlet 18. The second exterior spool extension 48 blocks the exhaust 20, preventing air from flowing through the exhaust 20. The valve spool 14 is positioned such that the first exterior spool extension 46 is located in the area that defines the first volume 22, and the second exterior spool extension 48 is located in an upper portion of the area that defines the second volume 24. That is, the first exterior spool extension 46 contacts the first seal retainer 26, and the second exterior spool extension 48 is spaced away from the second seal retainer 28. The first vent passage 54 is located within the first seal retainer 26 and is not in fluid communication with the first volume 22. The second vent passage 56 is in fluid communication with the second volume 24. When the valve 10 is in the actuated position, the annular resilient member 86 is located in the first annular groove 84, which acts as a detent to retain the valve spool 14 in position. The first volume 22 is occupied by the first exterior spool extension 46 and therefore contains no air, and the bottom area of the second volume 24 is not occupied by any structure and therefore contains air. In the actuated position, the first volume 22 contains approximately 0% of the air, and the upper area of the second volume 24 contains approximately 100% of the air.

Figure 5:
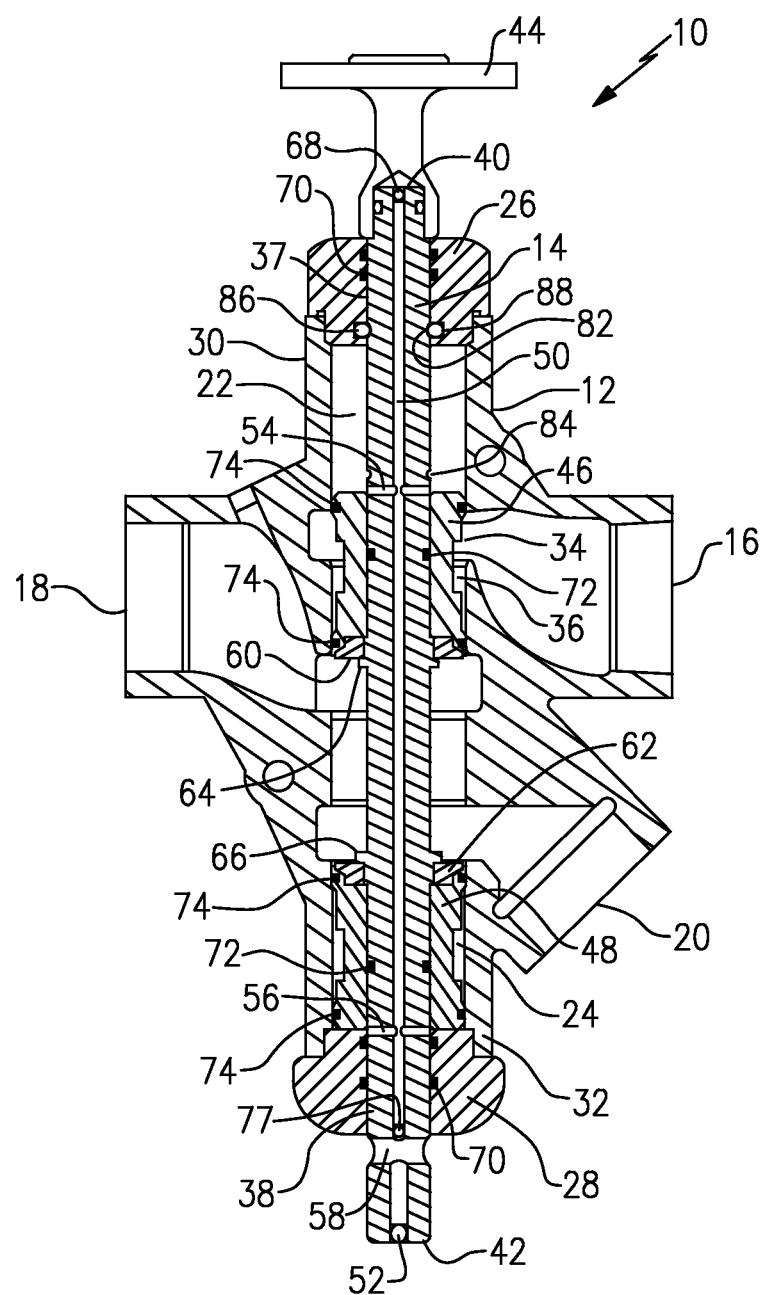
FIG. 5 illustrates the valve in the non-actuated position.

When the valve 10 is to be moved to the non-actuated position (or closed position, as shown in FIG. 5), the handle 44 is manually grabbed by a user and pushed downwardly relative to FIG. 1. The first exterior spool extension 46 is moved away from the first seal retainer 26, and the second exterior spool extension 48 is moved closer to the second seal retainer 28, removing the annular resilient member 86 from the first annular groove 84. As the valve spool 14 moves downwardly, the valve spool 14 temporarily moves to the position shown in FIG. 3. The first exterior spool extension 46 is partially blocking the inlet 16. As the valve spool 14 moves downwardly, air in the second volume 24 flows through the second vent passage 56, through the central vent passage 50, through the first vent passage 54 and into the first volume 22. The vent passages 50, 54 and 56 allow the air to flow between the first volume 22 and the second volume 24. In this position, there is x % of air in the first volume 22, and 100−x % of air in the second volume 24.

Figure 3:
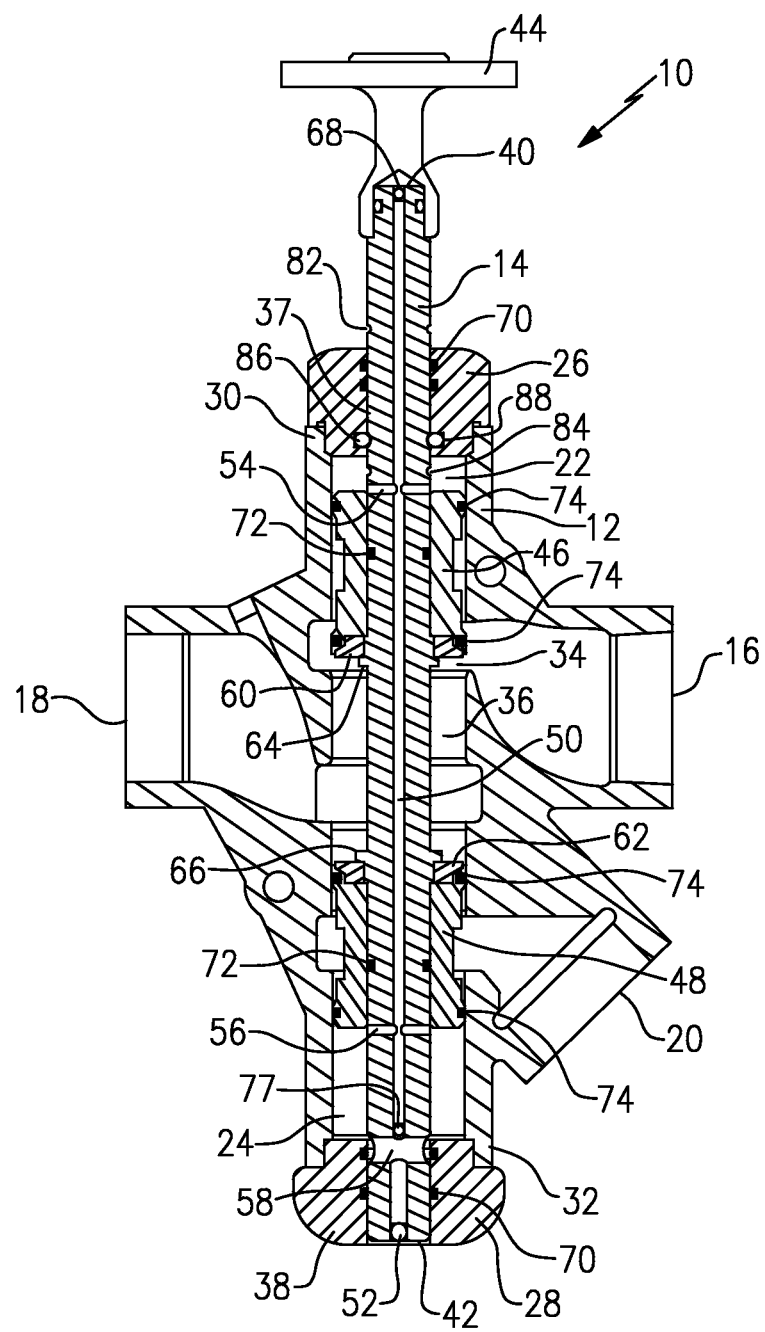
FIG. 3 illustrates the valve in a first intermediate position between the actuated position and a non-actuated position.
Figure 4:
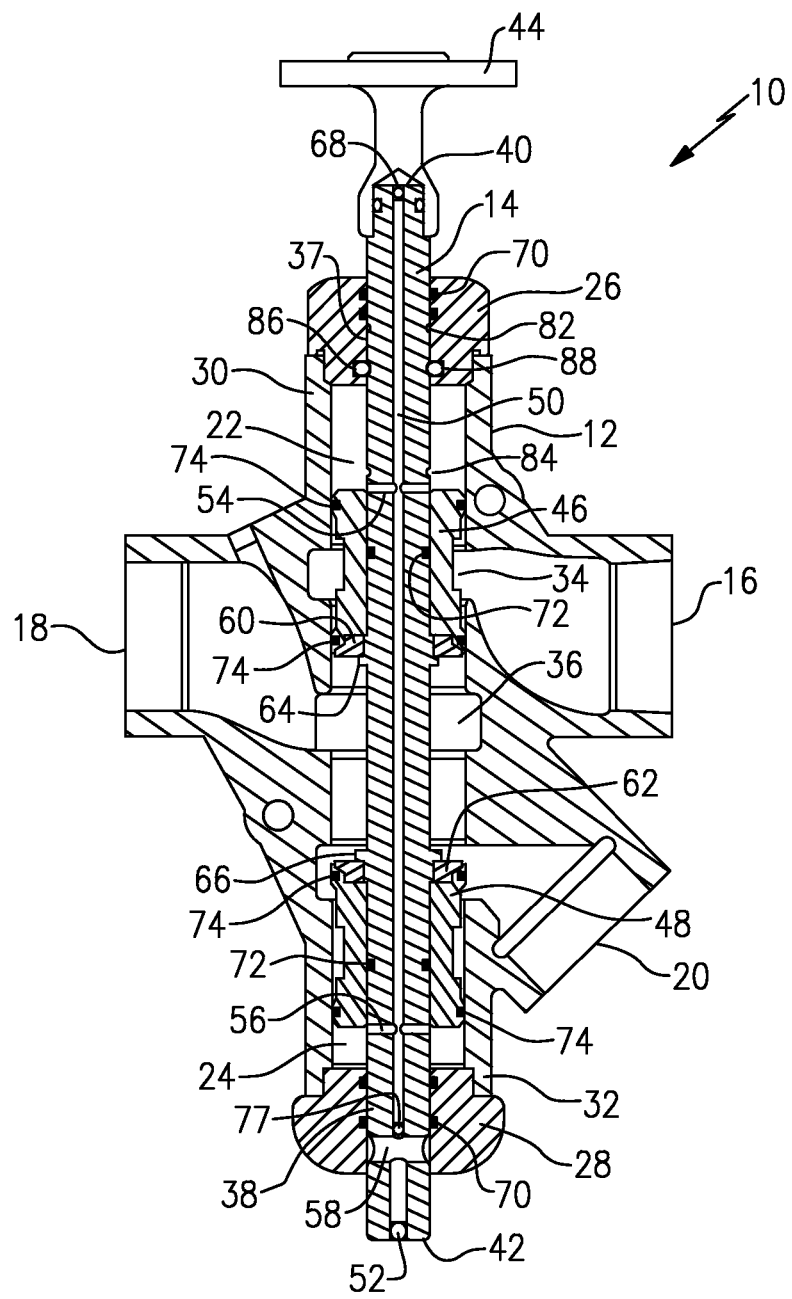
FIG. 4 illustrates the valve in a second intermediate position between the actuated position and the non-actuated position.

As the valve spool 14 continues to move downwardly, the valve spool 14 temporarily moves to the position shown in FIG. 4. In this position, the first exterior spool extension 46 is moved farther away from the first seal retainer 26 than the FIG. 3 position, and the second exterior spool extension 48 is moved closer to the second seal retainer 28 than the FIG. 3 position. The first exterior spool extension 46 completely blocks the inlet 16, and the second exterior spool extension 48 only partially blocks the exhaust 20. As the valve spool 14 moves downwardly, air in the second volume 24 flows through the second vent passage 56, through the central vent passage 50, through the first vent passage 54 and into the first volume 22. The vent passages 50, 54 and 56 allow the air to flow between the first volume 22 and the second volume 24. In this position, there is y % of air in the first volume 22, and 100−y % of air in the second volume 24, where y is greater than x.

The valve spool 14 continues to move downwardly until the second exterior spool extension 48 contacts the second seal retainer 28, as shown in FIG. 5. The valve is then in the non-actuated position (or closed position). The fluid is exhausted through the exhaust 20. The first exterior spool extension 46 blocks the inlet 16, preventing air from flowing into the valve 10. As the valve spool 14 moves to the non-actuated position, air in the second volume 24 flows through the second vent passage 56, through the central vent passage 50, through the first vent passage 54 and into the first volume 22. The vent passages 50, 54 and 56 allow the air to flow between the first volume 22 and the second volume 24. The valve spool 14 is positioned such that the first exterior spool extension 46 is partially located in the air passage 36, and the second exterior spool extension 48 is located in a lower portion of the area that defines the second volume 24. That is, the first exterior spool extension 46 is moved away from the first seal retainer 26, and the second exterior spool extension 48 contacts the second seal retainer 28. The first vent passage 54 is in fluid communication with the first volume 26. The second vent passage 56 is located within the second seal retainer 28 and is not in fluid communication with the second volume 24. When the valve 10 is in the non-actuated position, the annular resilient member 86 is located in the second annular groove 82, which acts as a detent to retain the valve spool 14 in position. The first volume 22 is not occupied by any structure and therefore contains air, and the bottom area of the second volume 24 is occupied by the second exterior spool extension 48 and therefore contains no air. In the position, the first volume 22 contains approximately 100% of the air, and the second volume 24 contains approximately 0% of the air.

Once the valve 10 is in the non-actuated position, a lock 80 (shown schematically), such as a padlock, can be inserted into the lock passage 58 to retain the valve spool 14 in the non-actuated position. The lock 80 prevents movement of the valve spool 14 relative to the valve body 12.

If the valve 10 is to be actuated, the lock 80 is removed from the lock passage 58, and a user grabs the handle 44 and pulls upwardly (relative to FIG. 5). As the valve spool 14 moves upwardly, the annular resilient member 86 is removed from the second annular groove 82 of the valve spool 14, and the valve spool 14 temporarily moves to the position shown in FIG. 4. As the valve spool 14 moves, air in the second volume 24 flows through the second vent passage 56, through the central vent passage 50, through the first vent passage 54 and into the first volume 22. The vent passages 50, 54 and 56 allow the air to flow between the first volume 22 and the second volume 24. In this position, there is y % of air in the first volume 22, and 100−y % of air in the second volume 24.

As the valve spool 14 continues to move upwardly, the valve spool 14 temporarily moves to the position shown in FIG. 3. As the valve spool 14 moves, air in the second volume 24 flows through the second vent passage 56, through the central vent passage 50, through the first vent passage 54 and into the first volume 22. The vent passages 50, 54 and 56 allow the air to flow between the first volume 22 and the second volume 24. In this position, there is x % of air in the first volume 22, and 100−x % of air in the second volume 24.

The valve spool 14 continues to move upwardly until the first exterior spool extension 46 contacts the first seal retainer 26, as shown in FIG. 1. The valve is then in the actuated position (or open position). The annular resilient member 86 is located in the first annular groove 84 of the valve spool 14 to retain the valve spool 14 in position. The fluid flows from the inlet 16 to the outlet 18. As the valve spool 14 moves to the actuated position, air in the first volume 22 flows through the first vent passage 54, through the central vent passage 50, through the second vent passage 56 and into the second volume 24. The vent passages 50, 54 and 56 allow the air to flow between the first volume 22 and the second volume 24. In the actuated position, the first volume 22 contains approximately 0% of the air, and the second volume 24 contains approximately 100% of the air.

Venting is important during shifting of the valve spool 14 relative to the valve body 12. As the valve spool 14 moves relative to the valve body 12, the volumes of the first volume 22 and the second volume 24 are variable as air flows between the two volumes 22 and 24 through the vent passages 50, 54 and 56. The volume of the first volume 22 and the second volume 24 change inversely relatively to each other during movement of the valve spool 14 relative to the valve body 12. As one volume decreases, the other volume increases. Therefore, the total volume of the first volume 22 and the second volume 24 is constant. The vent passages 50, 54 and 56 eliminate the need for an exterior vent hole, preventing outside contaminants from entering the valve 10 as the air in the first volume 122 and the second volume 24 is sealed within the valve body 12, as further shown by the movement of the valve spool 14 in FIGS. 1 and 3 to 5.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A valve comprising:
    a valve body including a main passage defining a first volume and a second volume; and
    a valve spool moveable relative to the valve body, the valve spool including a central vent passage capable of fluid communication with each of the first volume and the second volume, wherein air flows between the first volume and the second volume through the central vent passage as the valve spool moves relative to the valve body to change the valve between an actuated position and a non-actuated position, wherein the air in the first volume and the second volume is sealed within the valve body,
    wherein the valve spool includes a first vent passage and a second vent passage that are substantially transverse to the central vent passage and in fluid communication with the central vent passage, the first vent passage is capable of fluid communication with the first volume and the second vent passage is capable of fluid communication with the second volume.

2. The valve as recited in claim 1 wherein, when the valve is in the actuated position, the first vent passage is not in fluid communication with the first volume and the second vent passage is in fluid communication with the second volume, and when the valve is in the non-actuated position, the first vent passage is in fluid communication with the first volume and the second vent passage is not in fluid communication with the second volume.

3. The valve as recited in claim 2 wherein air flows through the first vent passage, the second vent passage and the central vent passage as the valve spool moves relative to the valve body to transfer air between the first volume and the second volume.

4. The valve as recited in claim 2 wherein the first volume contains no air and the second volume contains air when the valve is in the actuated position, and the first volume contains air and the second volume contains no air when the valve is in the non-actuated position.

5. The valve as recited in claim 1 wherein the first vent passage and the second vent passage are substantially perpendicular to the central vent passage.

6. The valve as recited in claim 1 including a first exterior spool extension and a second exterior spool extension attached to the valve spool, wherein the first exterior spool extension and the second exterior spool extension separate and define the first volume and the second volume.

7. The valve as recited in claim 6 including a seal between each of the first exterior spool extension and the second exterior spool extension, wherein the seal includes a portion made of an elastomer and a portion made of a non-stick material, and the non-stick material contacts the valve body.

8. A valve comprising:
a valve body including a main passage defining a first volume and a second volume; and
a valve spool moveable relative to the valve body, the valve spool including a central vent passage capable of fluid communication with each of the first volume and the second volume, wherein air flows between the first volume and the second volume through the central vent passage as the valve spool moves relative to the valve body to change the valve between an actuated position and a non-actuated position, wherein the air in the first volume and the second volume is sealed within the valve body;
a first exterior spool extension and a second exterior spool extension attached to the valve spool, wherein the first exterior spool extension and the second exterior spool extension separate and define the first volume and the second volume; and
a seal between each of the first exterior spool extension and the second exterior spool extension, wherein the seal includes a portion made of an elastomer and a portion made of a non-stick material, and the non-stick material contacts the valve body,
wherein, when the valve is in the actuated position, fluid enters the valve through an inlet and exits the valve through an outlet and the second exterior spool extension blocks an exhaust and, when the valve is in the non-actuated position, the fluid exits the valve through the exhaust and the first exterior extension blocks the inlet.

9. The valve as recited in claim 1 wherein the valve spool includes a lock passage that receives a lock to retain the valve in the non-actuated condition.

10. The valve as recited in claim 1 wherein the first volume plus the second volume is a constant volume.

11. The valve as recited in claim 1 wherein a first seal retainer is located at a first end of the valve body, and a second seal retainer is located at an opposing second end of the valve body.

12. A valve comprising:
a valve body including a main passage defining a first volume and a second volume; and
a valve spool moveable relative to the valve body, the valve spool including a central vent passage capable of fluid communication with each of the first volume and the second volume, wherein air flows between the first volume and the second volume through the central vent passage as the valve spool moves relative to the valve body to change the valve between an actuated position and a non-actuated position, wherein the air in the first volume and the second volume is sealed within the valve body,
wherein a first seal retainer is located at a first end of the valve body and a second seal retainer is located at an opposing second end of the valve body, and
wherein the first seal retainer includes an annular groove that receives an annular resilient member and the valve spool includes a first annular recess and a second annular recess, wherein the annular resilient member is received in the first annular recess when the valve is in the actuated condition, and the annular resilient member is received in the second annular recess when the valve is in the non-actuated condition.

13. A valve comprising:
a valve body including a main passage defining a first volume and a second volume; and
a valve spool moveable relative to the valve body, the valve spool including a central vent passage capable of fluid communication with each of the first volume and the second volume, wherein air flows between the first volume and the second volume through the central vent passage as the valve spool moves relative to the valve body to change the valve between an actuated position and a non-actuated position, wherein the air in the first volume and the second volume is sealed within the valve body,
wherein a first seal retainer is located at a first end of the valve body, and a second seal retainer is located at an opposing second end of the valve body, and
wherein the valve spool extends through a first passage of the first seal retainer and a second passage of the second seal retainer.

14. A valve comprising:
a valve body including a main passage defining a first volume and a second volume; and
a valve spool moveable relative to the valve body, the valve spool including a central vent passage, and a first vent passage and a second vent passage that are substantially transverse to the central vent passage and in fluid communication with the central vent passage, wherein the first vent passage is capable of fluid communication with the first volume and the second vent passage is capable of fluid communication with the second volume, air flows between the first volume and the second volume through the central vent passage, the first vent passage, the second vent passage as the valve spool moves relative to the valve body to change the valve between an actuated position and a non-actuated position; and
a first exterior spool extension and a second exterior spool extension attached to the valve spool,
wherein, when the valve is in the actuated position, the first vent passage is not in fluid communication with the first volume and the second vent passage is in fluid communication with the second volume, and when the valve is in the non-actuated position, the first vent passage is in fluid communication with the first volume and the second vent passage is not in fluid communication with the second volume,
wherein the first volume contains no air and the second volume contains air when the valve is in the actuated position, and the first volume contains air and the second volume contains no air when the valve is in the non-actuated position, and
wherein the air in the first volume and the second volume is sealed within the valve body.

15. The valve as recited in claim 14 wherein air flows through the first vent passage, the second vent passage and the central vent passage as the valve spool moves relative to the valve body to transfer air between the first volume and the second volume.

16. The valve as recited in claim 14 including a seal between each of the first exterior spool extension and the second exterior spool extension, wherein the seal includes a portion made of an elastomer and a portion made of a non-stick material, and the non-stick material contacts the valve body.

17. The valve as recited in claim 14 wherein, when the valve is in the actuated position, fluid enters the valve through an inlet and exits the valve through an outlet and the second exterior spool extension blocks an exhaust and, when the valve is in the non-actuated position, the fluid exits the valve through the exhaust and the first exterior extension blocks the inlet.

18. The valve as recited in claim 14 wherein the first volume plus the second volume is a constant volume.

\* \* \* \* \*